(12) United States Patent
Kangas et al.

(10) Patent No.: US 8,731,503 B2
(45) Date of Patent: May 20, 2014

(54) RF PERFORMANCE IMPROVEMENT

(75) Inventors: Mika P. Kangas, Oulu (FI); Mika P. Eade, Oulu (FI); Harri P. Luhtala, Oulu (FI); Ari J. Koski, Lempaala (FI); Jari J. Huhtamaki, Oulu (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 12/770,133

(22) Filed: Apr. 29, 2010

(65) Prior Publication Data

US 2011/0269418 A1 Nov. 3, 2011

(51) Int. Cl.
*H04B 17/00* (2006.01)

(52) U.S. Cl.
USPC ............... 455/226.2; 455/63.1; 455/67.13

(58) Field of Classification Search
USPC ............ 455/63.1, 63.4, 66.1, 67.11, 67.16, 455/67.7, 566, 90.1–90.2
See application file for complete search history.

(56) References Cited

U.S. PATENT DOCUMENTS

| | | | | |
|---|---|---|---|---|
| 4,542,326 | A | 9/1985 | Hornback | 318/565 |
| 6,304,170 | B1 | 10/2001 | Armstrong et al. | 340/407.1 |
| 7,265,728 | B1 | 9/2007 | Tsao | 343/766 |
| 2004/0198411 | A1* | 10/2004 | Cheng et al. | 455/550.1 |
| 2004/0203530 | A1 | 10/2004 | Liang et al. | 455/90.3 |
| 2006/0157632 | A1 | 7/2006 | Delson | 248/550 |
| 2006/0284578 | A1 | 12/2006 | Hughes | 318/114 |
| 2007/0010208 | A1* | 1/2007 | Goldberg | 455/67.14 |
| 2008/0132283 | A1* | 6/2008 | Ponce De Leon et al. | 455/566 |
| 2009/0174510 | A1 | 7/2009 | Kim | 335/222 |

FOREIGN PATENT DOCUMENTS

| | | |
|---|---|---|
| CN | 101009822 A | 8/2007 |
| CN | 201374387 | 12/2009 |
| EP | 2 131 443 A1 | 12/2009 |
| JP | 9232842 A | 9/1997 |
| JP | 10190552 A | 7/1998 |
| RU | 2368077 C1 | 9/2009 |
| WO | WO-96/13875 A1 | 5/1996 |

* cited by examiner

*Primary Examiner* — Christian Hannon
(74) *Attorney, Agent, or Firm* — Harrington & Smith

(57) ABSTRACT

A method is disclosed that includes measuring, under control of one or more processors of a mobile device, performance of a radio frequency reception parameter for radio frequency reception for the mobile device. The mobile device includes one or more antennas over which the radio frequency reception occurs and the one or more processors. The method includes causing movement of the mobile device to improve the performance of the radio frequency reception parameter. A mobile device includes one or more antennas over which radio frequency reception occurs, one or more processors, and one or more memories including computer program code. The mobile device performs at least the following: measuring, under control of the one or more processors, performance of a radio frequency reception parameter, and causing movement of the mobile device to improve the performance of the a radio frequency reception parameter. Program products are also disclosed.

15 Claims, 14 Drawing Sheets ized block diagram of a
RF PERFORMANCE IMPROVEMENT

TECHNICAL FIELD

This invention relates generally to radio frequency (RF) reception and transmission and, more specifically, relates to controlling position of a mobile device in order to improve RF reception and/or transmission.

BACKGROUND

Many mobile devices are incorporating multiple radio frequency (RF) receivers, such as amplitude modulation (AM), frequency modulation (FM), and digital video receivers. Digital video receivers include digital video broadcasting (DVB) terrestrial (DVB-T) and DVB handheld (DVB-H). Although these receivers are useful, there are problems with radio reception using the receivers.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 8, including

FIG. 14 includes.

SUMMARY

Figure 2:
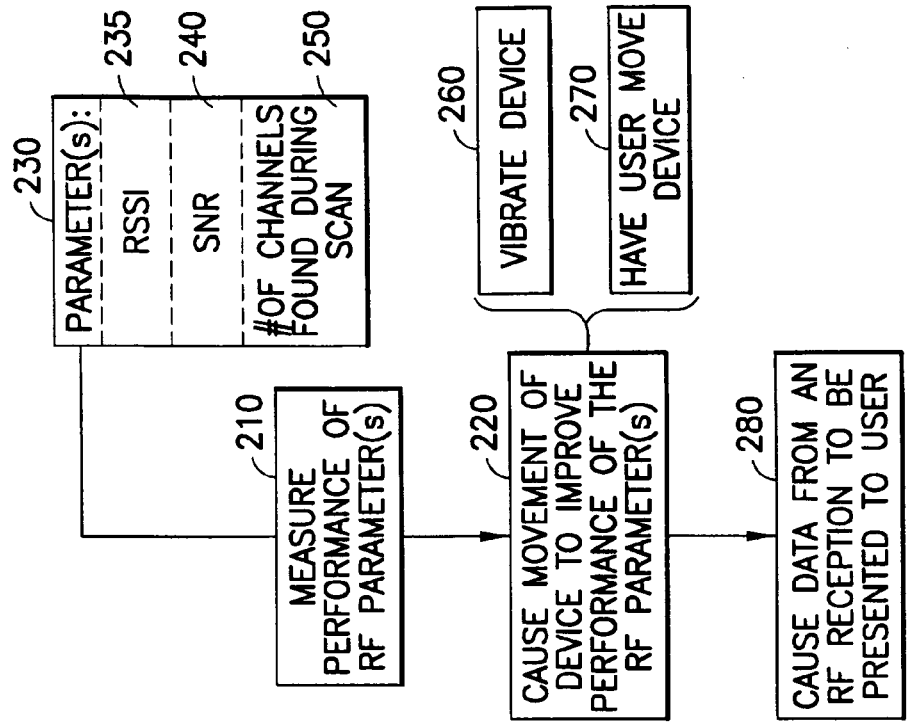
FIG. 2 is a block diagram of an exemplary flowchart for radio frequency performance improvement by causing movement (e.g., controlling position) of a device (e.g., a mobile device)

In an exemplary embodiment, a method is disclosed that includes measuring, under control of one or more processors of a mobile device, performance of at least one radio frequency reception parameter for radio frequency reception of the mobile device. The mobile device includes one or more antennas over which the radio frequency reception occurs and the one or more processors. The method includes causing movement of the mobile device to improve the performance of the at least one radio frequency reception parameter.

In another exemplary embodiment, a mobile device includes one or more antennas and one or more receivers over which radio frequency reception occurs, one or more processors, and one or more memory including computer program code. The one or more memories and the computer program code are configured to, with the one or more processors, cause the mobile device to perform measuring, under control of the one or more processors, performance of at least one radio frequency reception parameter, and causing movement of the mobile device to improve the performance of the at least one radio frequency reception parameter.

In a further exemplary embodiment, a computer program product is disclosed that includes a computer-readable memory medium bearing computer program code embodied therein for use with a computer. The computer program code includes code for measuring, under control of one or more processors of a mobile device, performance of at least one radio frequency reception parameter for radio frequency reception of the mobile device. The mobile device includes one or more antennas over which the radio frequency reception occurs and the one or more processors. The computer program code further includes code for causing movement of the mobile device to improve the performance of the at least one radio frequency reception parameter.

DETAILED DESCRIPTION OF THE DRAWINGS

As described above, many mobile devices are incorporating multiple radio frequency (RF) receivers, such as amplitude modulation (AM), frequency modulation (FM), and digital video receivers. Digital video receivers include digital video broadcasting (DVB) terrestrial (DVB-T) and DVB handheld (DVB-H). The FM, AM, and DVB (as examples) radio performance is dependent on, e.g., the received radio frequency signal strength and/or quality. The signal reception capability of a device changes according to the position of the device and therefore the position of the antenna in the device. There are currently very few ways of altering the signal reception of a mobile device, and none known that do not require complex antenna movement systems.

Aspects of the invention correct this because the antenna (typically an internal antenna) position can be altered by adjusting the position of the device on the (x, y, z) axis or combination of the axes. In one exemplary embodiment, vibration is used to adjust the position of the device and hence the antenna. In another exemplary embodiment, a user is presented with a user interface and the user is prompted to move the mobile device into or near a position deemed to have high radio performance.

The automatic positioning of the antenna and its associated device is done by determining a performance of a radio frequency reception, such as by monitoring the radio frequency (RF) receive signal strength indicator (RSSI) value and/or signal to noise ratio (SNR) value and/or the number of channels found during a frequency band scan. In an exemplary embodiment, the device is turned on its axis by controlling, for example, the internal vibra (e.g., vibration elements) of the device. While the device is turning, the RSSI values (for instance) are determined and stored as history data and the peak (e.g., optimal) sensitivity values are set as a benchmark for ongoing measurements. After the device has performed several RF measurements, the best possible RF receiving position is selected by evaluating the saved RF sensitivity values. Further, the device does not have to determine the exact position angle of the best RF reception, since the device can start to turn back to the opposite direction that the device was turning before. When roughly the same level of sensitivity is found, the device knows that optimal positioning has been found. These techniques can be utilized also for other RF devices equipped with internal antenna, such as DVB-T/H or analog receivers.

Certain tests were performed to determine the effect of the orientation of a phone and how the orientation affects the signal strength in a real office environment. In this testing, the signal strength varied as wide as −64 to −94 dBm (decibel-milliwatts).

For instance, an experiment involving an automated channel search was performed, showing one use case that was heavily affected by the orientation and signal strengths. The phone used was a NOKIA X3, which includes an internal frequency modulation (FM) antenna. The phone was placed on a table in an office and in a worst case scenario, the phone could not find any stations with an automated search. After rotating the phone to an optimal angle, the automated search found seven stations. This performance increase happened only because the reception signal levels were much better and better detection therefore occurred.

Figure 1A:
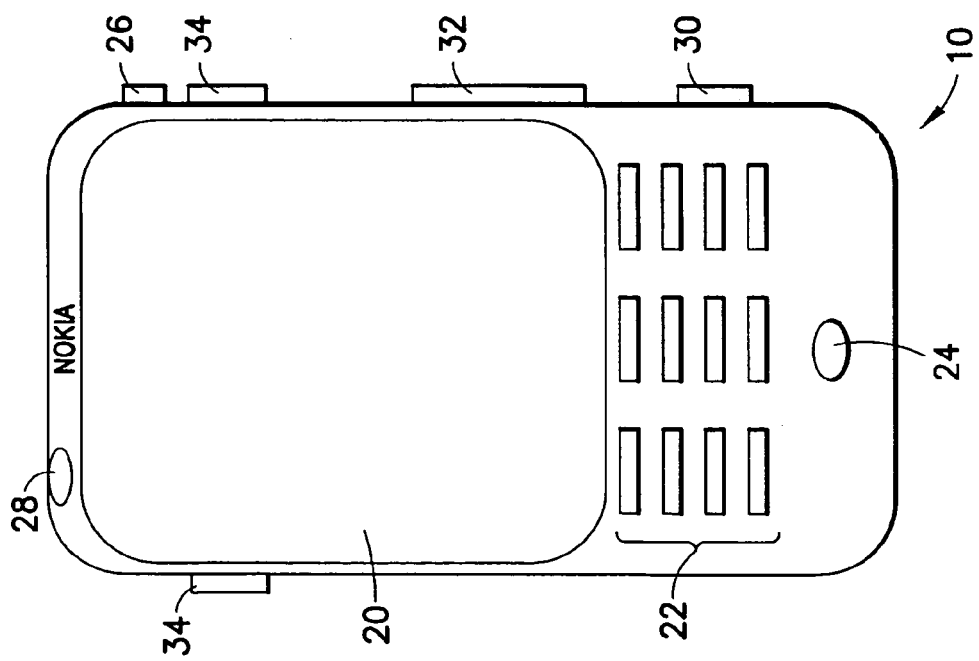
FIG. 1A shows a simplified block diagram of an exemplary mobile device suitable for use in practicing the exemplary embodiments of this invention.
Figure 1B:
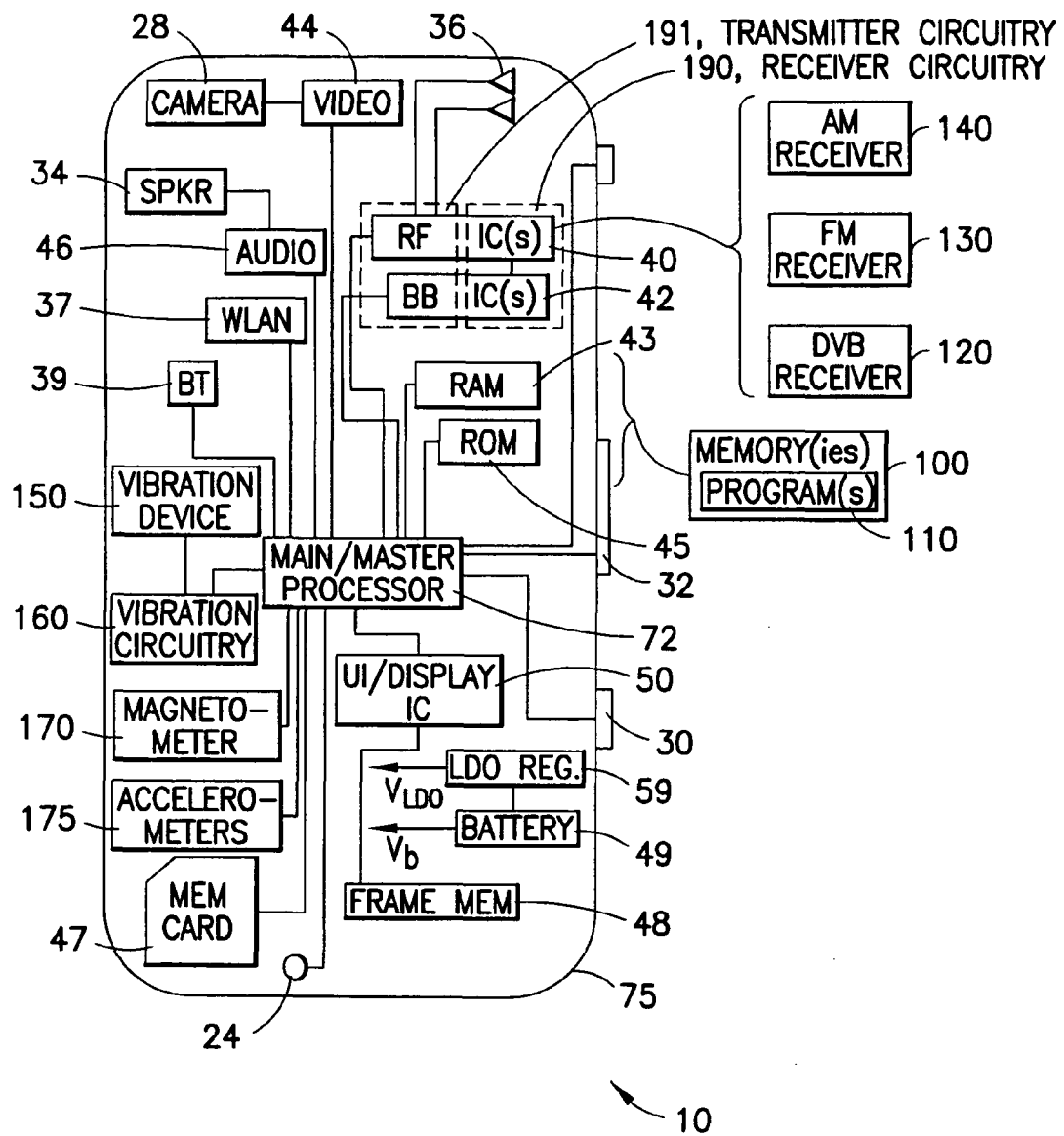
FIG. 1B shows a more particularized block diagram of a mobile device such as that shown at FIG. 1A.

Before proceeding with additional description of the invention, attention is first directed to an exemplary mobile device 10 that is suitable for carrying out some exemplary embodiments of the invention. FIG. 1, including FIG. 1A and FIG. 1B, illustrates detail of an exemplary mobile device 10 in both plan view (FIG. 1A) and sectional view (FIG. 1B), and the invention may be embodied in one or some combination of the function specific components shown in FIG. 1. At FIG. 1A, the mobile device 10 has a graphical display interface 20 and a user interface 22 illustrated as a keypad but understood as also encompassing touch screen technology at the graphical display interface 20 and voice recognition technology received at the microphone 24. A power actuator 26 controls the device being turned on and off by the user. The exemplary mobile device 10 may have a camera 28 which is shown as being forward facing (e.g., for video calls) but may alternatively or additionally be rearward facing (e.g., for capturing images and video for local and/or remote storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 1B are seen the multiple receive antennas 36 and transmit antennas 36 (e.g., transducing means 36) that are typically used for radio frequency (e.g., cellular) communication. One or more of the antennas 36 may be capable of receiving only, transmitting only or both receiving and transmitting radio frequency signals. The antennas 36 may be multi-band for use with other radios in the mobile device 10. The operable ground plane for the antennas 36 may span, in an exemplary embodiment, the entire space enclosed by the housing 75 though in some embodiments the ground plane may be limited to a smaller area, such as disposed on a printed wiring board on which, e.g., the RF integrated circuit(s) 40 and baseband integrated circuit(s) 42 are formed. In other exemplary embodiments the ground plane may comprise other parts of the mobile device 10, for example and not limited to, the ground plane may comprise a conductive body of a battery, the mobile device body, chassis or casing, an additional portion of conductive material galvanically or electromagnetically coupled to the main printed wiring board of the mobile device. The RF integrated circuit(s) 40 controls power amplification on the channels being transmitted and/or across the antennas 36 that transmit simultaneously where spatial diversity is used, and amplifies the received signals. The RF integrated circuit(s) also, in this example, demodulates and downconverts the signal for baseband processing. The baseband (BB) integrated circuit 42 detects the signal which is then converted to a bit stream and finally decoded. Similar processing occurs in reverse for signals generated in the mobile device 10 and transmitted from it. In this example, the radio frequency integrated circuit(s) 40 and baseband integrated circuit(s) 42 may be logically divided into receiver circuitry 190 and transmitter circuitry 191. The radio frequency integrated circuits 40 and the receiver circuitry 190 include, as possible examples of the types of receivers that might be used, an amplitude modulation (AM) receiver 140, a frequency modulation (FM) receiver 130, and a digital video broadcast (DVB) receiver 120. These receivers may use the antennas 36 or have their own antenna(s) (not shown).

Those signals that go to and from the camera 28 pass through an image/video processor 44 that encodes and decodes image frames. A separate audio processor 46 may also be present controlling signals to and from the speakers 34 and the microphone 24. The graphical display interface 20 is refreshed from a frame memory 48 as controlled by a user interface integrated circuit 50, which may process signals to and from the display interface 20 and/or additionally process user inputs from the keypad 22 and elsewhere.

Some embodiments of the mobile device 10 may also include one or more secondary radios such as a wireless local area network (WLAN) radio 37 and a BLUETOOTH (BT) radio 39, which may incorporate an antenna on the integrated circuit or be coupled to an antenna off the integrated circuit. As is known, BLUETOOTH is a wireless protocol for exchanging data over short distances. Throughout the mobile device 10 are various memory/memories 100 such as random access memory RAM 43, read only memory ROM 45, and in some embodiments removable memory such as the illustrated memory card 47. On the memories 100, various programs 110 may be stored. The programs 110 include, e.g., an operating system and computer program code for carrying out the exemplary operations described herein. All of these components within the mobile device 10 are normally powered by a portable power supply such as a battery 49, which produces a voltage $V_b$. In the example of FIG. 1B, a low dropout (LDO) regulator 59 is also shown, and the LDO regulator 59 produces a regulated voltage $V_{LDO}$. Typically, this regulated voltage is used instead of the voltage from the battery 49, but that may not be the case for all components.

If integrated circuits 40, 42, 44, 46, 50 are embodied as separate entities in a mobile device 10, these may operate in a slave relationship to the main processor 72 (also an integrated circuit), which may then be in a master relationship to them. Embodiments of this invention may be disposed across various integrated circuits and memories as shown, or disposed within another processor that combines some of the functions described above for FIG. 1B. Any or all of these various processors of FIG. 1B access one or more of the various memories, which may be on an integrated circuit with the processor or separate from the processor.

Note that the various processors (e.g., 40, 42, 44, 46, 50, 72) that were described above may be combined into a fewer number than described and, in a most compact case, may all be embodied physically within a single integrated circuit. An integrated circuit, as is known, is an electronic circuit built on a semiconductor (or insulator) substrate, usually one of single-crystal silicon. The integrated circuit, often called a chip, may be packaged in a hermetically sealed case or a non-hermetically sealed plastic capsule, with leads extending from it for input, output, and power-supply connections, and for other connections that may be necessary when the device is put to use. It is also noted that any of the processors (e.g., 40, 42, 44, 46, 50, 72) may also include other circuitry, such as discrete circuitry, and may include such circuitry as programmable logic devices and gate arrays. The program(s) 110 may therefore be implemented as hardware elements, or as software that executes as part of one or more of the processors (e.g., 40, 42, 44, 46, 50, 72), or as some combination of hardware and software.

The mobile device 10 further includes a vibration device 150 and a vibration circuitry 160. In the example of FIG. 1B, the vibration device 150 and vibration circuitry 160 are separate, although they may be combined, or the vibration circuitry 160 incorporated into a processor, such as main processor 72. Additionally, there could be multiple vibration devices 150 and potentially associated vibration circuitry 160 (or a single vibration circuitry 160 and multiple vibration devices 150).

For example, the vibration circuitry 160 could comprise circuitry for creating an oscillating wave, and the vibration device 150 could be a piezoelectric actuator. As another example, the vibration circuitry 160 could include a suitably sized electric motor that drives a small gear with an off-center weight (the gear and the off-center weight being the vibration device 150) and the vibration circuitry 160 would output a control signal for causing the electric motor to rotate in one direction (and perhaps also the opposite direction). The vibration circuitry 160 could comprise circuitry for creating an oscillating wave, and the vibration device could use elastic members/leaf springs, where a coil is applied the oscillating wave and a magnet, coupled to the elastic member/leaf springs, moves in response to the fields produced by the coil. The vibration device 150 could also be a linear actuator with an appropriate vibration circuit 160 suitable for controlling the linear actuator. Any vibration circuitry 160 and vibration device 150 may be used that causes enough vibration to cause the mobile device 10 to move.

Another element in some mobile device 10 is a magnetometer 170. The magnetometer 170 may be used in some embodiments to improve position (e.g., angle) determination for a mobile device 10. This is explained in more detail below.

A further element in some mobile device 10 is one or more accelerometers 175. These accelerometers 175 can be used to determine if the mobile device 10 has been moved, as explained in more detail below.

Figure 3:
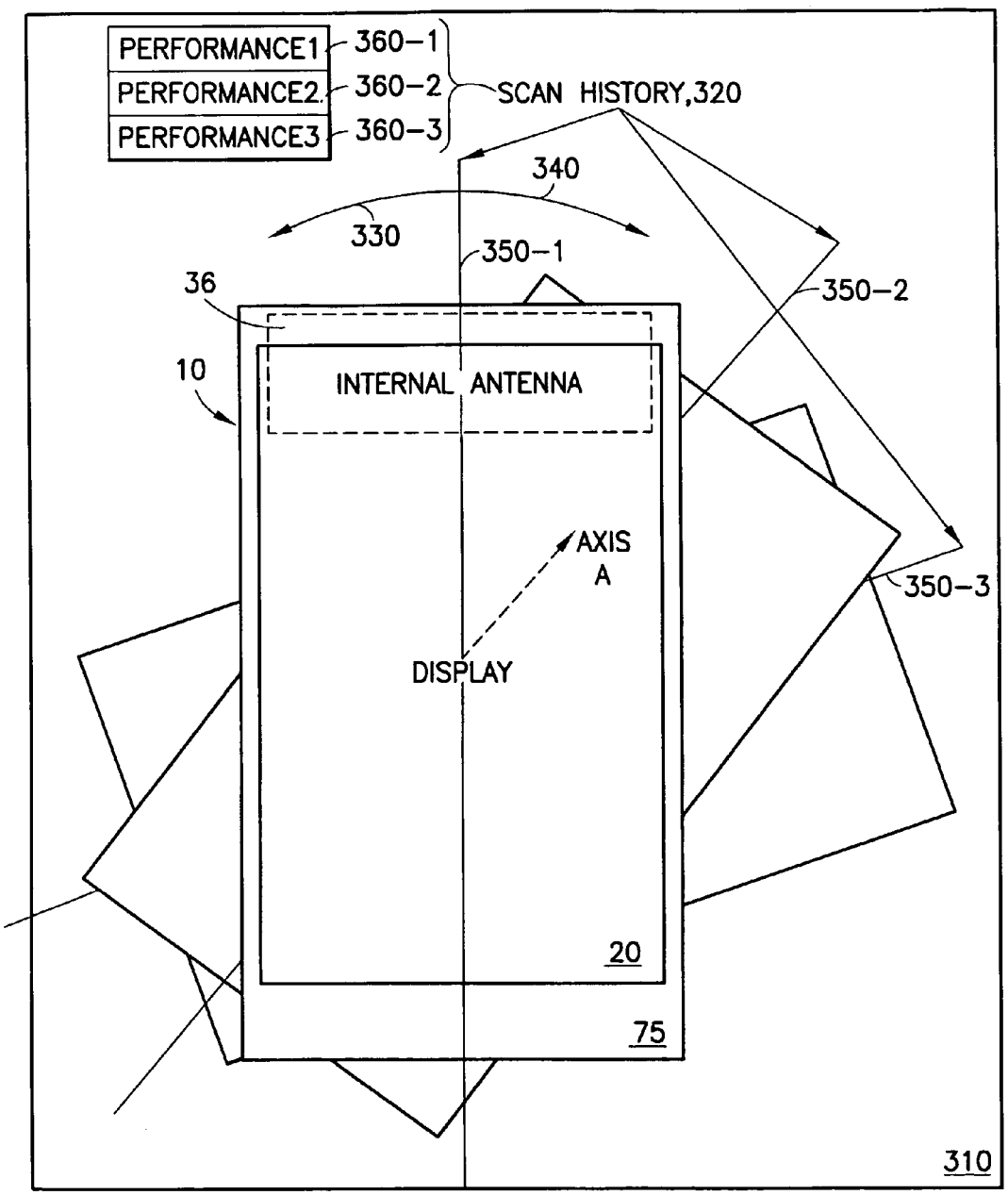
FIG. 3 is an illustration of movement of mobile device 10 on a surface and an associated scan history.

Referring now to FIG. 2, a block diagram is shown of an exemplary flowchart for radio frequency performance improvement by causing movement (e.g., controlling position) of a device (e.g., a mobile device). In block 210, performance of RF parameter(s) 230 of an RF reception is (or are) measured. Such performance parameters 230 include, as non-limiting examples, one or more of RSSI 235, SNR 240, or number of channels 250 found during a scan of possible channels. The performance of the RF parameter(s) 230 may be measured, e.g., by the RF integrated circuit 40 and/or the baseband integrated circuit 42, under control of one or more of the processors described above (typically, at least the main/master processor 72). As shown in FIG. 3 (described below), the performance could be measured at discrete intervals or continuously.

In block 220, movement of the device is caused to improve performance of the RF parameters. Typically, one or more of the processors described in reference to FIG. 1B (such as the main/master processor 72) cause the movements through techniques to be described. In one exemplary embodiment, the movement is created by vibrating the device (block 260). Such vibration may be caused by the vibration circuitry 160 (e.g., under control of one or more processors 72) and vibration device 150, as described above. The movement may also be caused by having the user move the device (block 270), as described in more detail below.

In block 280, the device, under control of one or more processors (such as main/master processor 72) presents data from the reception to the user. For instance, data from AM receiver 140 or FM receiver 130 could be presented, e.g., via a speaker 34 or BT radio 39. As another example, visual data from DVB receiver 120 could be presented to a user using, e.g., display 20 (and, e.g., UI/display integrated circuit 50 and frame memory 48) and audio data from DVB receiver 120 could be presented to a user using, e.g., a speaker 34 or BT radio 39.

Turning to FIG. 3, an exemplary illustration is shown of movement of a mobile device 10 on a surface 310 and an associated scan history 320. In this example, the mobile device 10 can be moved (by, e.g., vibration or a user) in the counter-clockwise direction 330 or clockwise direction 340, around the axis (Axis A) of the device. In this example, Axis A points into (or out of) the page. The mobile device 10 also has antenna(s) 36 that fill an upper portion of the housing 75. FIG. 3 shows the mobile device 10 being moved in direction 340 on the surface 310. The surface 310 may be, for example, a surface of a table or desk (not illustrated). As the mobile device 10 moves and is oriented in different directions, the scan history 320 is collected at a number of locations 350-1, 350-2, and 350-3. The scan history 320 includes in this example values 360-1, 360-2, and 360-3 for performance measured at each respective location 350-1, 350-2, and 350-3. It is noted that these locations 350 may be considered directions to which the mobile device 10 should be changed or, put another way, locations that indicate orientations of the mobile device 10. The scan history 320 may be used to determine at which location 350 a value 360 is optimal (typically, meaning the value 360 is the highest, although this may not always be the case; for instance, bit error rate would use the smallest value).

An example where a combination of performance measurements might be used is as follows. The mobile device tunes to X frequency. The mobile device is configured to be rotated or rotates to find an optimal position for the antenna 36 (e.g., and the receiver 120, 130, 140, if different antennas 36 are used for these receivers). The RSSI and SNR values are measured after a certain amount of rotational movement (e.g., see FIG. 3) and the measurement and position information (if available) is saved. The comparison of the measurements is performed as follows. First, the measurements are organized according to RSSI values. Next, it is checked whether the SNR is over some acceptable predetermined threshold level (e.g., a predetermined threshold criterion) for the best RSSI value; if so, then this position is chosen. The predetermined threshold criterion may be programmed in software in the mobile device 10 or it may be manually selected by the user of the mobile device 10 via the graphical display interface 20 and the input keys 22. Otherwise, check the next best RSSI value and its corresponding SNR value, and this process continues until a position is chosen. In this example, the primary measure is the RSSI, which indicates the signal strength. The secondary measure being used is the SNR, which is used to find an optimal signal quality. For example, if there are two or more similar areas that have roughly the same RSSI, the SNR may be evaluated to find the best signal quality and a position is chosen based on the SNR. This is merely an example, and other combinations of performance measurements may be used, and not limited to for example, receiver sensitivity level, bit error rate (BER), SINAD (signal to noise and distortion), etc.

Figure 4:
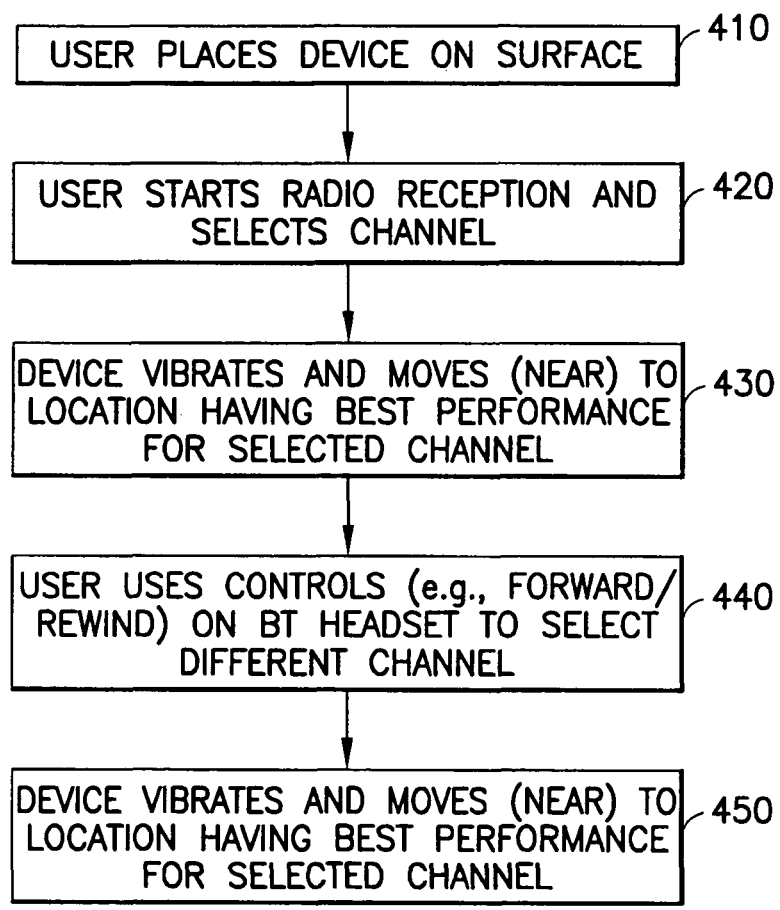
FIG. 4 is a block diagram of an exemplary flowchart for radio frequency performance improvement by causing movement of a device using vibration of the device for causing the movement.

A particular use case will now be described. Referring to FIG. 4, a block diagram is shown of an exemplary flowchart for radio frequency performance improvement by causing movement of a device using vibration of the device for causing the movement. As an example for an exemplary use case, consider a radio listening use case with a BLUETOOTH (BT) headset. For instance, a user would be able to listen, while lying on a sofa, to his or her favorite radio channel with his/her BT headset. The phone itself would be placed on a table, e.g., eight meters away. The user could adjust the radio channels via the BT headset controlling keys (e.g., Rewind/Forward) and the phone would be automatically searching for an optimal position by turning itself via vibration on the table. This way, the user would be able to find the optimal receiver sensitivity for a favorite radio channel.

More specifically, in block 410, the user places the mobile device 10 on a surface 310 of a table. In block 420, the user starts radio reception (e.g., through using a user interface on display 20 or using BT headset controlling keys) and selects a channel. In block 430, the mobile device 10 vibrates and moves (e.g., rotates as shown in FIG. 3) to a location determined to have the best performance for the selected channel. The best performance may be determined, e.g., using the scan history as shown in FIG. 3. In block 440, the user uses the controls on the BT headset to select a different channel. In block 450, the mobile device 10 vibrates and moves (e.g., rotates as shown in FIG. 3) to a location determined to have the best performance for the newly selected channel.

It is noted that both blocks 430 and 450 also refer to moving to a location "near" the location having the best performance for the selected channel. Assume (as a non-limiting example) a mobile device 10 in FIG. 3 moves an entire clockwise rotation and performs 12 discrete measurements of performance during the rotation. Assume that location 350-3 is deemed to be the best location, such as having the highest SNR for example. The mobile device 10 will then try to position itself near location 350-2, but due to limitations of movement caused by vibration, may only come near location 350-2. Thus, the ending location may not be exactly location 350-2. The main/master processor 72 may be programmed to allow this slight error, e.g., if the measured SNR is determined to be within some percentage of the "best" SNR, or if the final location is within a predetermined amount from the location 350-2.

It is noted that even though many mobile device 10 have vibration devices 150 and associated vibration circuitry 160, such vibration devices may not be powerful enough to move the mobile device 10. As a check, in an exemplary embodiment, a processor (e.g., main/master processor 72) could access a magnetometer 170 or accelerometer 175 prior to and after (or during) applying vibration to the mobile device 10 using vibration devices 150 and associated vibration circuitry 160. If the magnetometer 170 or accelerometer 175 indicates no movement (e.g., rotation) occurred, then a user interface may be used to prompt the user to move the mobile device 10. Exemplary user interfaces and techniques for using the user interfaces are now described.

Figure 5:
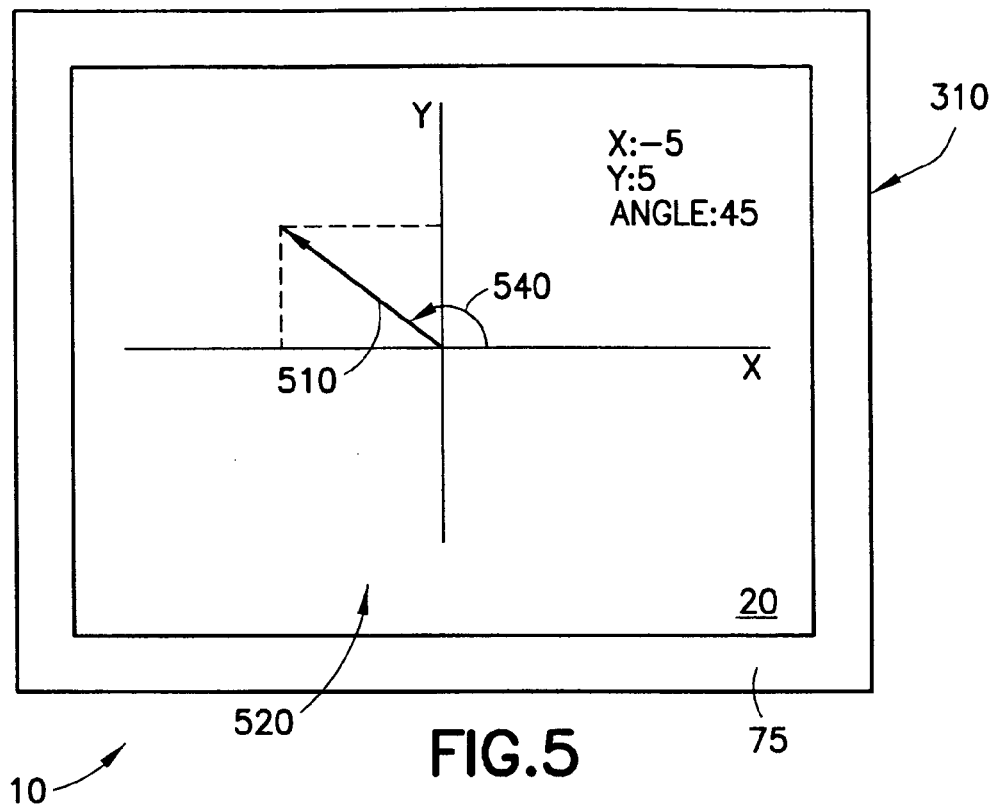
FIG. 5 is an example of a user interface for displaying in two dimensions a possible direction for improved radio frequency performance.

FIG. 5 is an example of a user interface 520 for displaying in two dimensions a possible direction for improved radio frequency performance. The user interface 520 in this example displays a two dimensional, X-Y graph interface that displays a vector 510 (e.g., an indicia) that indicates an approximate direction at which the mobile device 10 should be placed on the surface 310 in order to provide the best performance for a given RF reception. The X and Y values are listed, as is the angle (listed from the Y axis toward the X axis). The vector 510 may be determined, e.g., by using the magnetometer 170 or potentially the accelerometer 175. Also shown is an arrow 540 (e.g., an indicia) indicating which way a user should move the mobile device 10 to move the mobile device 10 toward the position associated with the best radio frequency performance, where the direction in this case is shown by a two dimensional vector 510. The vector 510 arrow 540 can be considered to be visual instructions to the user to move (e.g., orient) the mobile device 10 the way the arrow 540 shows.

Figure 6:
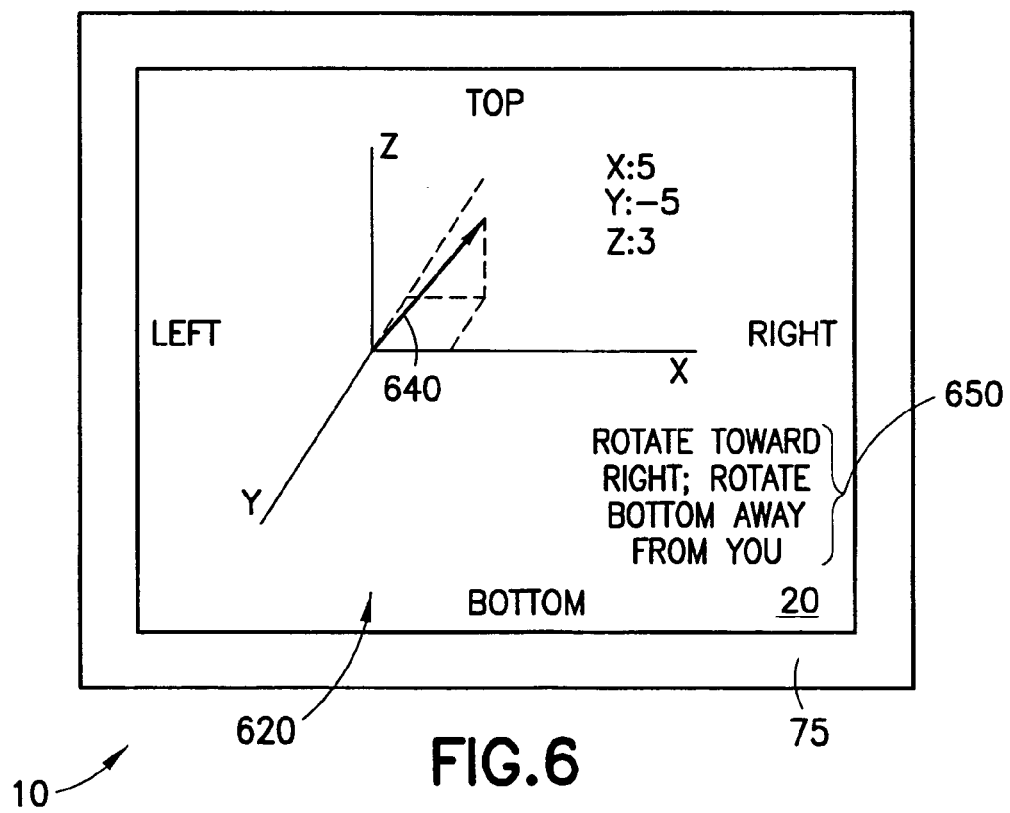
FIG. 6 is an example of a user interface for displaying in three dimensions a possible direction for improved radio frequency performance.

FIG. 6 is an example of a user interface 620 for displaying in three dimensions a possible direction for improved radio frequency performance. In this example, the arrow 640 (e.g., an indicia) indicates the best direction (e.g., orientation) is upward (in the Z axis), backward (along negative values of the Y axis) and to the right (in the X axis). The user interface 620 also has instructions 650 (e.g., an indicia) that recommend to the user the user rotate the mobile device 10 toward the right and rotate the bottom of the mobile device 10 away from the user. That is, the instructions 650 and the arrow 640 tell the user how to orient the device (in three dimensions) to achieve the best (or approximately the best) performance.

Figure 7:
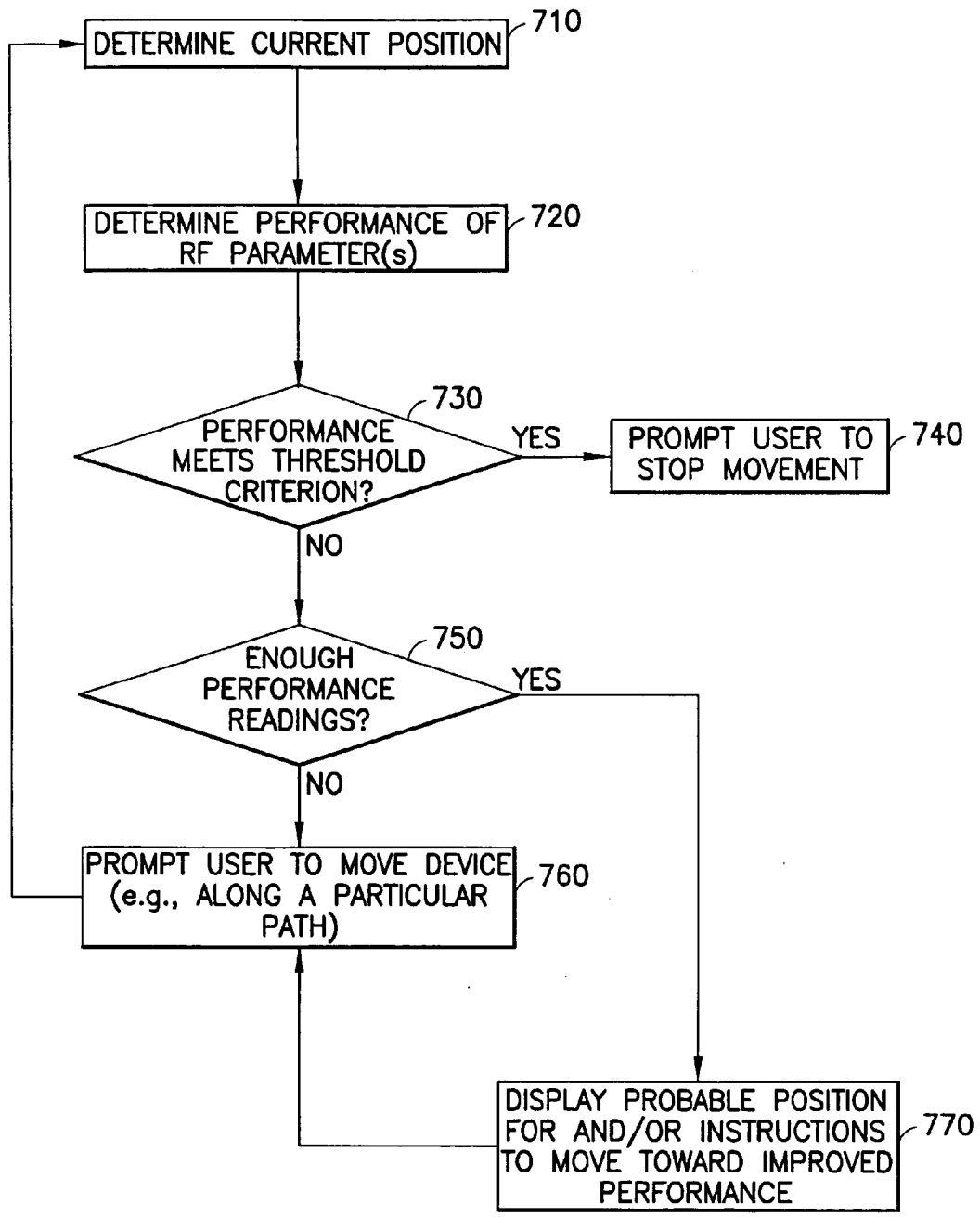
FIG. 7 is a block diagram of an exemplary flowchart for radio frequency performance improvement by causing movement of a device when positions of the device can be determined.

Turning to FIG. 7, a block diagram is shown of an exemplary flowchart for radio frequency performance improvement by causing movement of a device when positions of the device can be determined. In block 710, a current position is determined of the mobile device 10. Such a current position (such as one or more directions, e.g., along the X or Y axes) may be determined by, e.g., using a magnetometer 170. Another technique for determining the position might be to count the times the vibra (e.g., vibration device 150) is activated to rotate the device (see, e.g., FIGS. 10-12). By using this count value, one can orient the device back approximately to the original position or to a position which had good channel quality. At this position, the performance of the RF reception parameter(s) 230 is determined (block 720), e.g., by one or both of the RF integrated circuit 40 or the baseband integrated circuit 42. Such RF reception parameter 230 can be, e.g., RSSI 235, SNR 240, or number of channels 250 found during a scan.

In block 730, it is determined if the performance meets a predetermined threshold criterion (such as a highest value, above a certain value, etc.) has been achieved. If so (block 730=YES), the user interface 520, 620 (e.g., as directed by a processor) prompts the user to stop movement in block 740 and the flowchart ends. If the performance does not meet the predetermined threshold criterion (block 730=NO), in block 750, it is determined if there are enough performance readings for the RF parameter(s) 230 to display on a user interface 520, 620. If so (block 750=YES), in block 770 a display is presented of the probable position (e.g., as indicated by vector 510 or arrow 640 or any other orientation indication) and/or instructions to the user to move the mobile device 10 toward a direction (e.g., orientation) of improved performance.

If there are not enough performance readings (block 750=NO), in block 760, the user is prompted to move the device (e.g., along a particular path, such as "Rotate device toward right"). Block 710 is again performed.

Figure 8A:
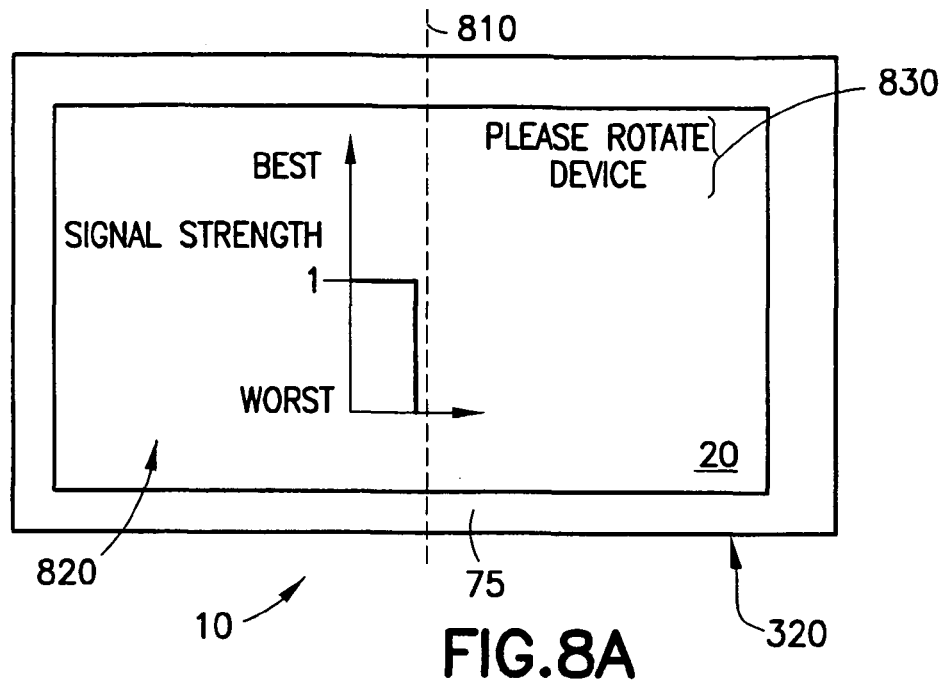
FIG. 8A and FIG. 8B, illustrate one possible user interface for indicating to a user whether the device should be moved to improve radio frequency performance.
Figure 8B:
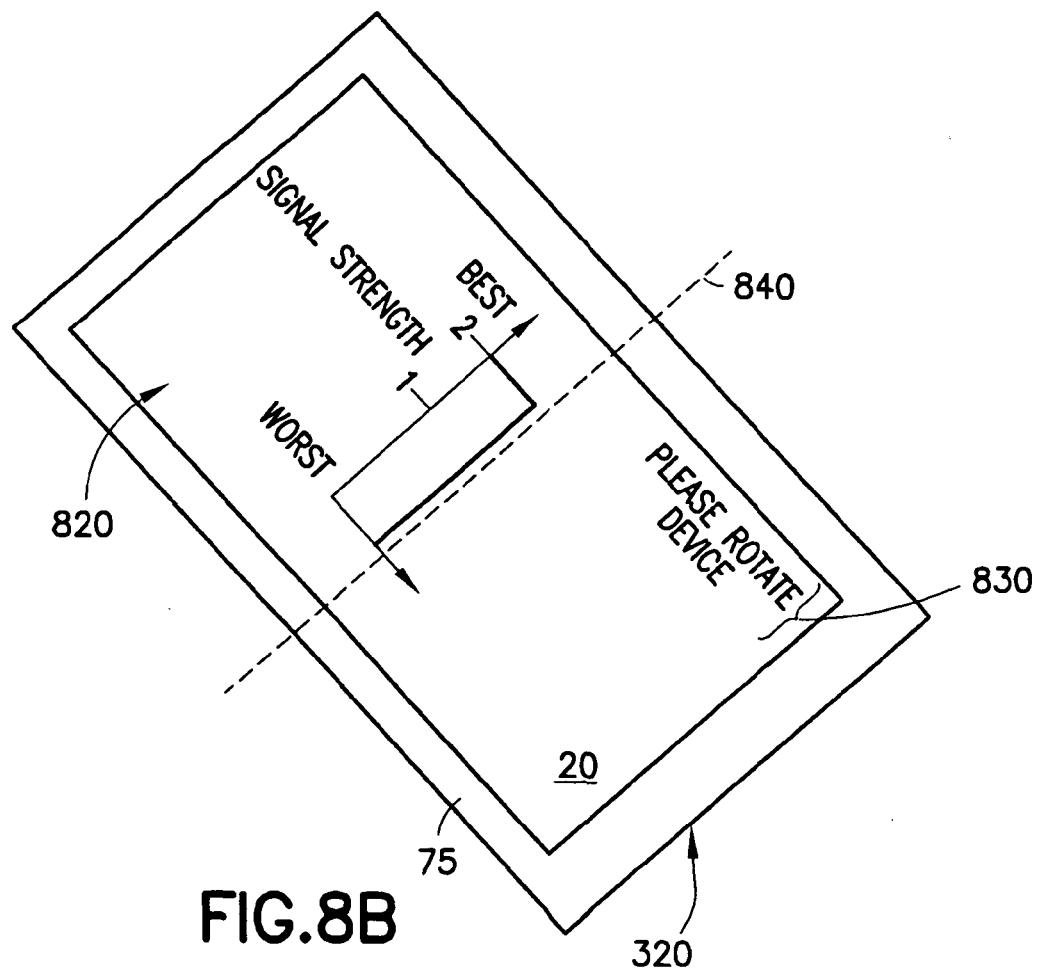

FIG. 8, including FIG. 8A and FIG. 8B, illustrate one possible exemplary user interface for indicating to a user whether the device should be moved to improve radio frequency performance. In the example of FIG. 8, positions of the device cannot be determined, and the vibration device 150 is not strong enough to move the mobile device 10. It should also be noted that the vibration device 150 may be strong enough to move the mobile device 10, but a user may decide to manually move the mobile device 10 anyway.

FIG. 8A shows a mobile device 10 in a first position 810 (in this example, on a surface 320), where the user interface 820 indicates a "signal strength" having a certain magnitude (indicated by the value one ("1"). In FIG. 8B, the mobile device 10 has been rotated on the surface 320 by the user to position 840, and the signal strength indicator is now of a higher magnitude (at the value "2" instead of at the value "1"). The user can therefore move the mobile device 10 around on the surface 320 until the highest signal strength is shown. It is noted that "signal strength" can be an indicator for any or all of the performance of the RF parameter(s) 230 previously discussed. The signal strength in FIG. 8 is a simplified value for presentation to a user.

Figure 9:
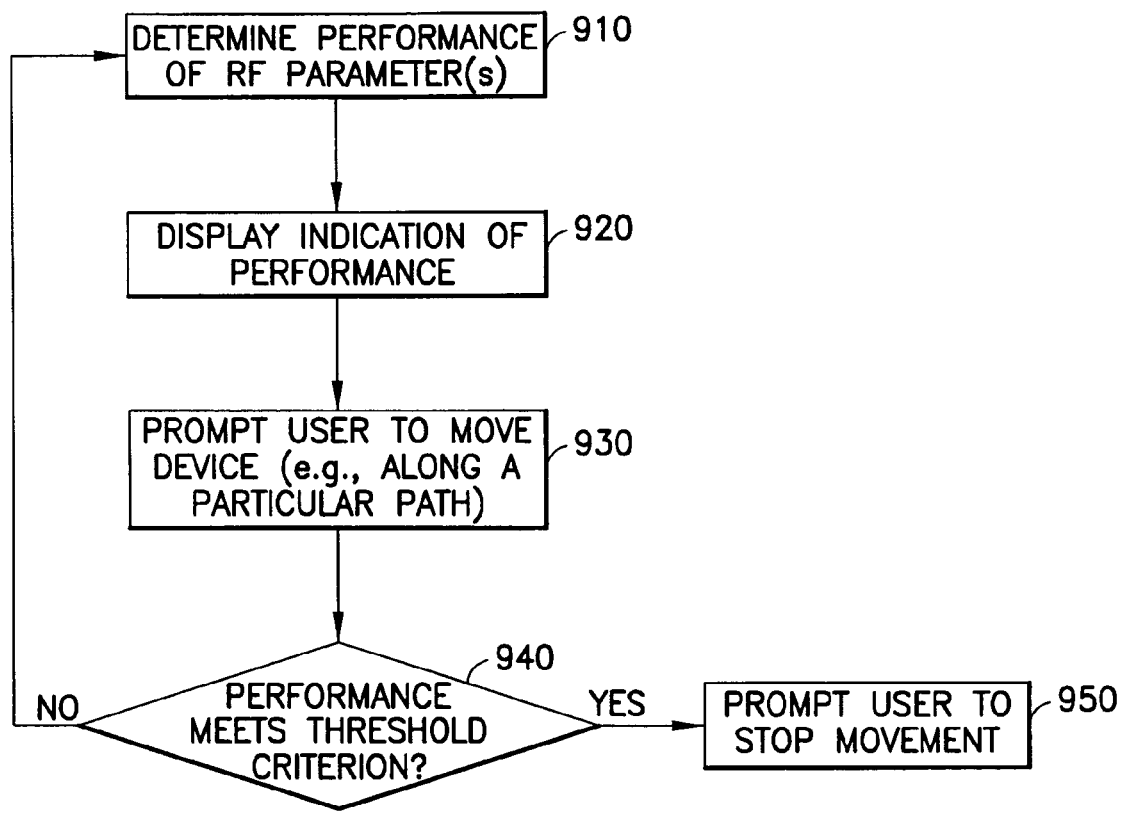
FIG. 9 is a block diagram of an exemplary flowchart for radio frequency performance improvement by causing movement of a device when positions of the device cannot be determined.

Turning to FIG. 9, a block diagram of an exemplary flowchart for radio frequency performance improvement by causing movement of a device when positions of the device cannot be determined. In block 910, the performance of the RF reception is determined, e.g., by one or both of the RF integrated circuit 40 or the baseband integrated circuit 42. Such RF parameter(s) 230 can be, e.g., RSSI 235, SNR 240, or number of channels 250 found during a scan. In block 920, an indication of the performance is displayed, e.g., as shown in FIG. 8. In block 930, the user is prompted to move the device, e.g., perhaps along a particular path. For instance, the user may be prompted to rotate the device clockwise. Although not necessary, prompting the user to move along a particular path can be helpful, as the mobile device 10 can determine if the performance decreases along the path. The mobile device 10 can then inform the user to reverse direction along the path.

In block 940, it is determined if the performance meets a predetermined threshold criterion. If not (block 940=NO), block 910 is performed again. If so (block 950=YES), block 950 is performed, which prompts the user to stop movement and the flowchart ends.

Figure 10:
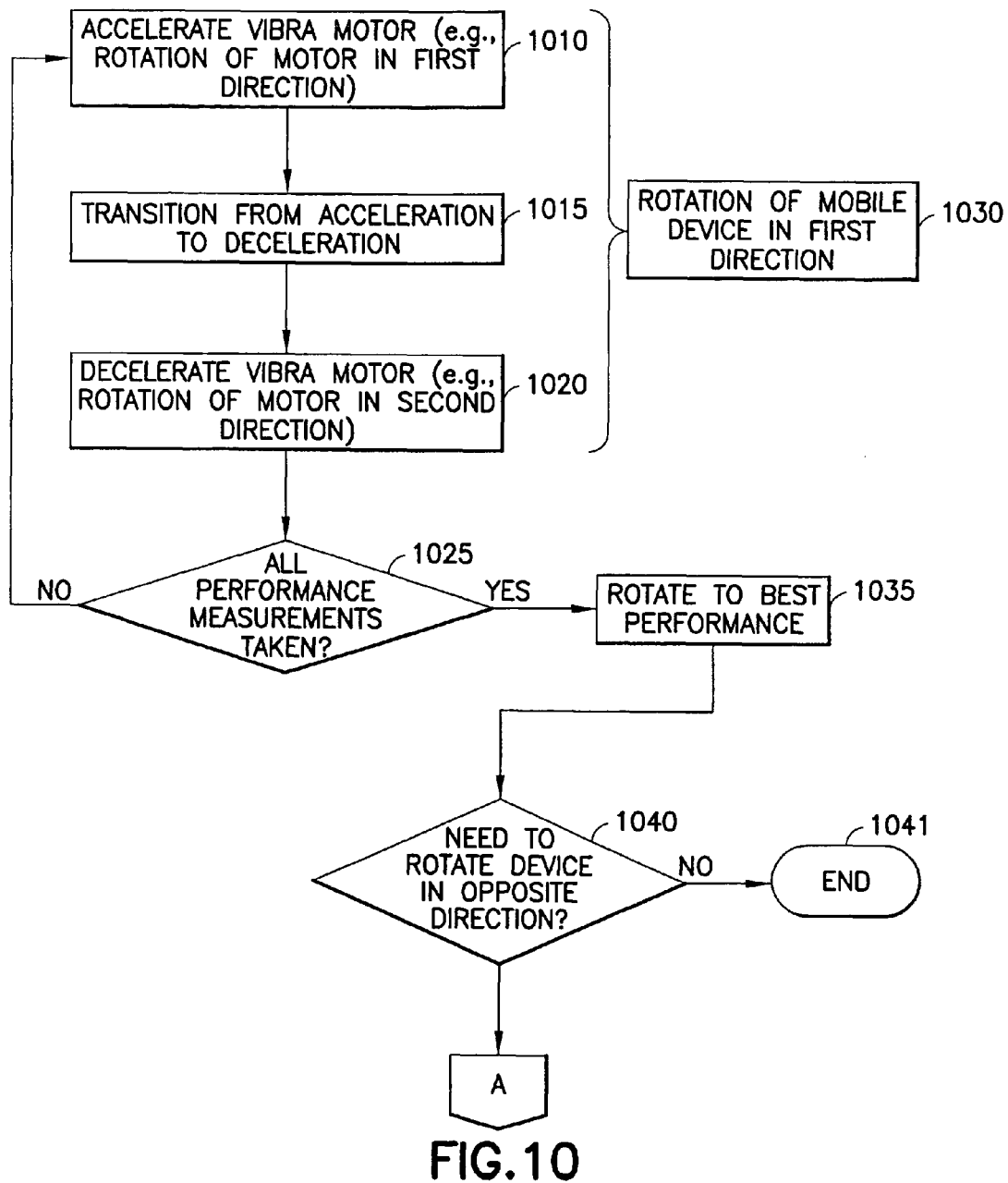
FIG. 10 is a block diagram of an exemplary flowchart for causing movement of a mobile device using internal vibra of the mobile device.
Figure 10:
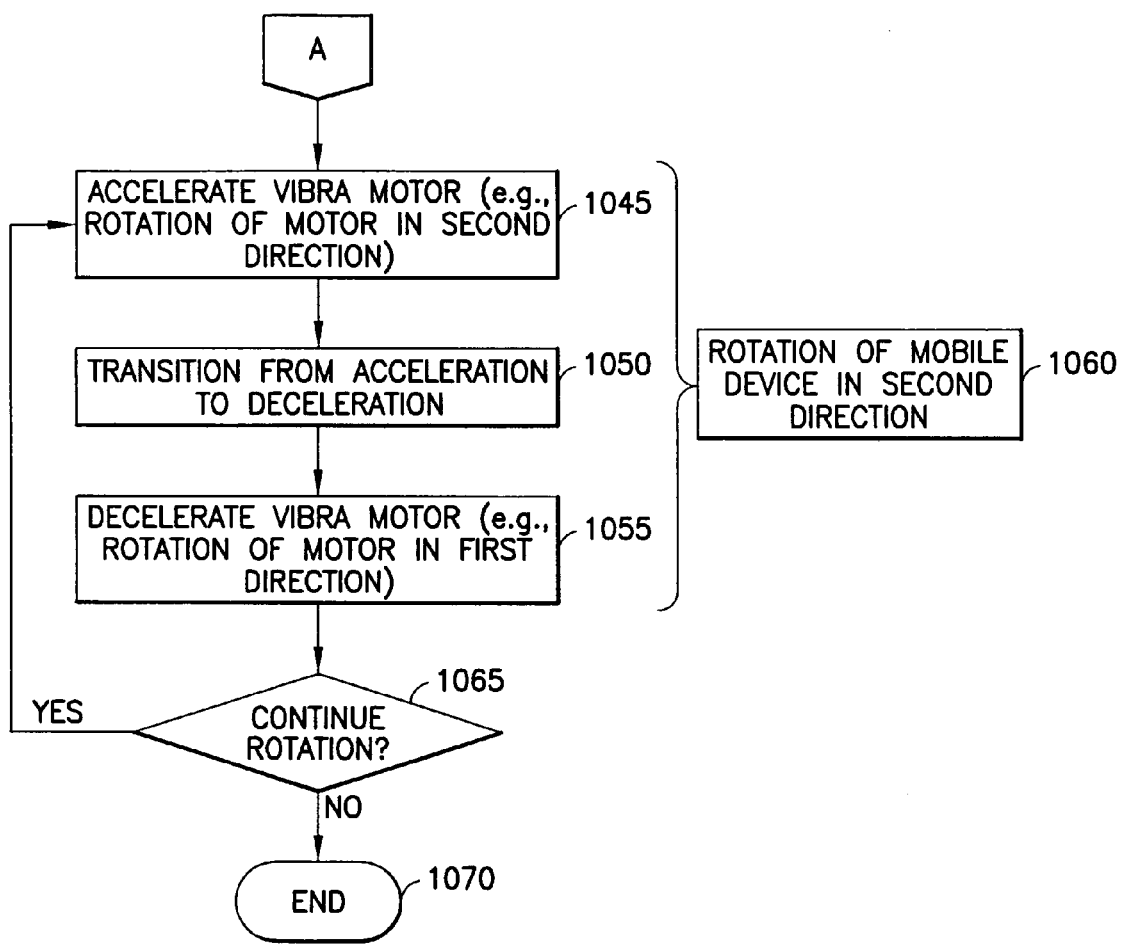
Figure 11:
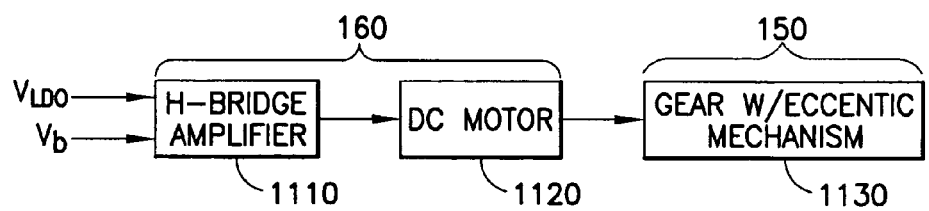
FIG. 11 is a block diagram of vibration circuitry and a vibration device used in the example of FIG. 10.
Figure 12:
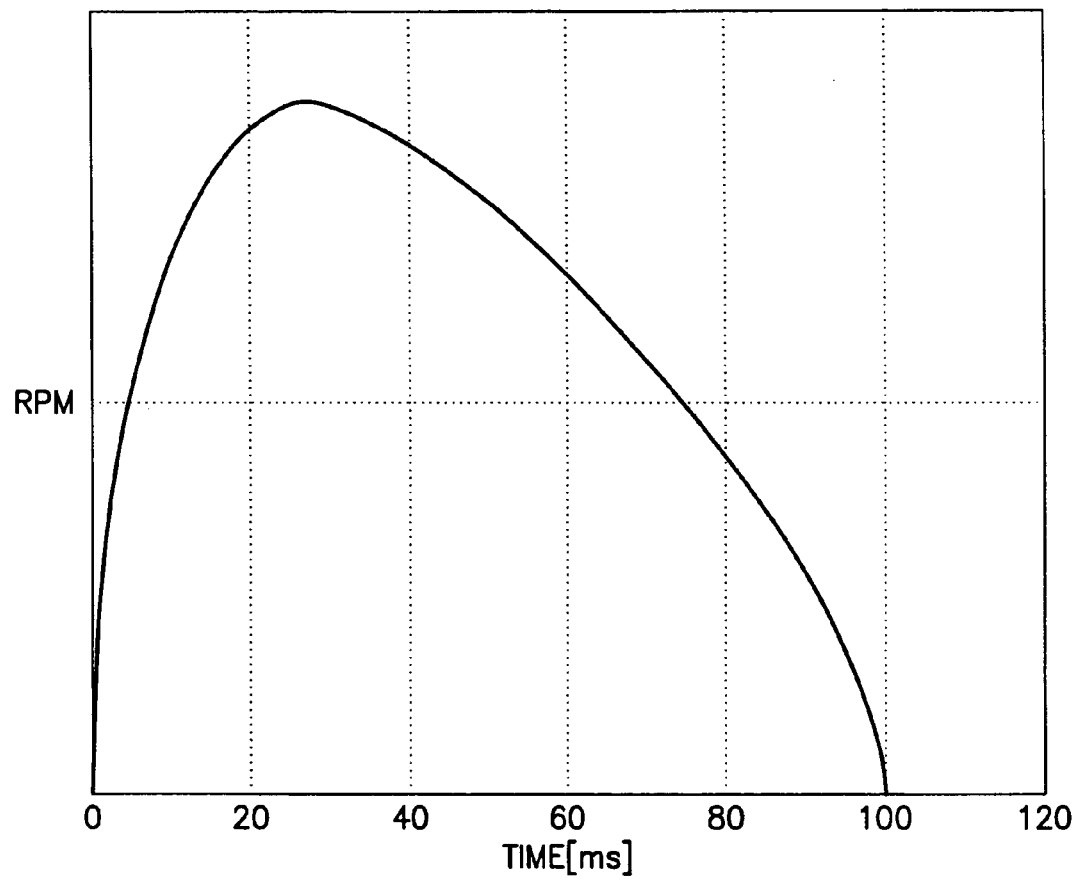
FIG. 12 is an example of a pulse driving the internal vibra of the mobile device.

Turning to FIGS. 10, 11, and 12 in addition to previous figures (such as FIG. 1B in particular), in FIG. 10 a block diagram is shown of an exemplary flowchart for causing movement of a mobile device 10 using an internal vibration device 150 of the mobile device 10. In the example of FIG. 10, it is assumed that the vibration circuitry 160 include (see FIG. 11) a suitably sized electric, direct current (DC) motor 1120 (called a vibra motor herein) that drives a small gear with an eccentric mechanism 1130 (the gear and the eccentric mechanism being the vibration device 150). It is noted the eccentric mechanism may be, e.g., an off-center weight. The vibration circuitry 160 also includes an H-bridge amplifier 1110 that can apply positive or negative DC voltage to the DC motor 1120. However, this is merely exemplary and any vibration circuitry 160 and vibration device 150 may be used.

The rotation of a mobile device such as mobile device 10 can be controlled by accelerating the integrated vibra motor of the device. The sequential acceleration of the vibra motor will be configured to cause the device to rotate either in a clockwise direction or a counterclockwise direction, depending on which direction the vibra motor rotation is controlled to move. To create the rotation of the device, an acceleration of the vibra motor is performed as a series of pulses, and the device will continue to rotate as long as the pulses are continued. A single exemplary pulse is shown in FIG. 12, in terms of rotations per minute (RPM) over time (in milliseconds, ms). To be able to create sequential acceleration within tens of milliseconds, one also should decelerate the vibra motor after every acceleration pulse. The principle is that the acceleration should be as fast as possible to get the mass (of the mobile device 10) to move and the deceleration on the other hand should be as slow possible. This structure and the techniques in FIGS. 10 and 12 are merely exemplary, however, and any other structure or techniques that cause a mobile device to rotate may be used.

Referring again to the example of FIG. 10, in block 1010, the vibra motor is controlled by a voltage derived from the LDO regulator 59 (e.g., derived from $V_{LDO}$) or directly from the battery 49 (e.g., derived from $V_b$). The voltage level is controlled (e.g., by vibration circuitry 160) in this example by using pulse width modulation (PWM). The acceleration is performed by applying a 100 percent PWM value for a few tens of milliseconds. For instance, 30 milliseconds might be used (see the example of FIG. 12). In this example, the current applied to the vibra motor is not actively controlled, although the current will change due to impedances and rotation of the motor. It is noted that in block 1010, the acceleration causes a predetermined vibration mode. In this example, the vibration mode is a clockwise rotation of an eccentric gear (e.g., a gear with an eccentric mechanism 1130).

In block 1015, a transition occurs from acceleration to deceleration. As noted above, in an exemplary embodiment, this transition should occur as fast as possible. In block 1020, the vibra motor is decelerated. The deceleration is done by reversing the voltage applied to the vibra motor (e.g., DC motor 1120). Voltage reversal can be done by using an H-bridge amplifier 1110 that is used to drive the motor. Depending on the vibra component properties, the deceleration may be performed by stopping the voltage supply, e.g., let the friction stop the motor, or may be performed actively, by applying PWM voltage (reversed in polarity from the voltage used in the acceleration) to the DC motor 1120 using the H-bridge amplifier 1110. Alternatively, if the friction is too high, the voltage should be slowly ramped down to zero volts. The deceleration should be made "lightly" so that the deceleration does not cause similar torque that turns the phone in the first place. In an example (the example shown in FIG. 12), the deceleration takes place over 70 milliseconds.

Blocks 1010, 1015, and 1030 rotate 1030 the mobile device 10 in a first direction, such as clockwise. In block 1025, it is determined if all performance measurements have been taken. If not (block 1025=NO), blocks 1010, 1015, and 1030 are performed again. It is noted that the rotation can occur for as long as desired, and it is not necessary to make a complete rotation of the device, although typically a complete rotation would be performed.

If all of the performance measurements have been performed (block 1025=YES), the mobile device 10 is rotated to approximately the direction of the best performance in block 1035. Should the direction be overshot (or for any other reason such as to slow the rotation of the mobile device near the direction of best performance), the mobile device 10 might need to have its rotation reversed. This is determined in block 1040, and if reversal is not needed, the flowchart ends in block 1041.

If there is a need to rotate the device in the opposite direction (e.g., including slowing the device), blocks 1010, 1015, and 1020 are performed again, with reversed polarity, as blocks 1045, 1050, and 1055. That is, in block 1045, if positive polarity was used in block 1010, negative polarity is used in block 1045. Similarly, if negative polarity was used in block 1045, positive polarity is used in block 1055. Block 1050 is unchanged, in this example, from block 1015.

Blocks 1045, 1050, and 1055 therefore rotate (block 1060) the mobile device 10 in the opposition direction from block 1030. In block 1065, it is determined if rotation should be continued. If not (block 1065=NO), the flowchart ends in block 1070. If so (block 1065=YES), blocks 1045, 1050, and 1055 are performed again.

Figure 13B:
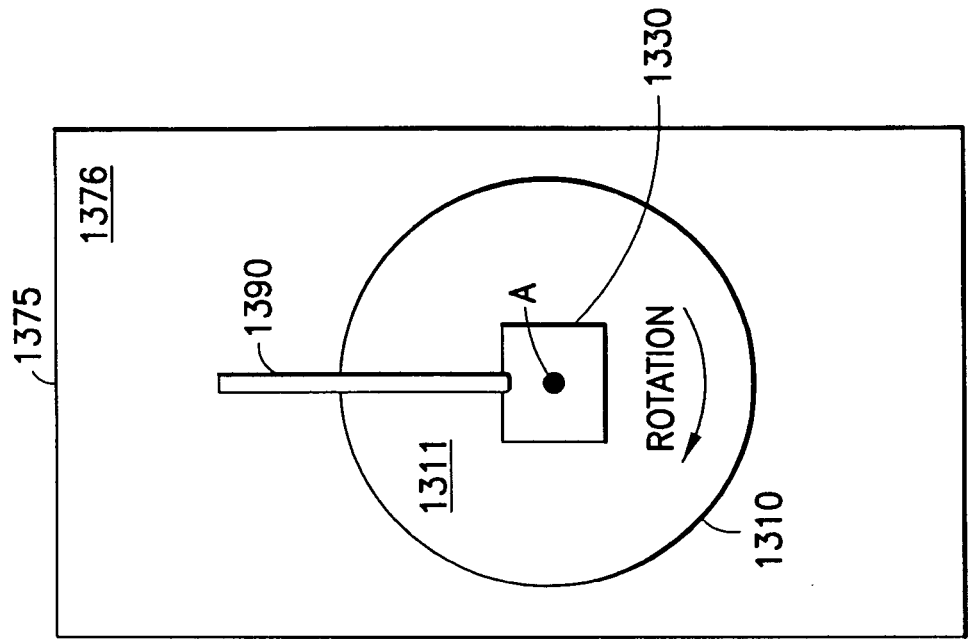
FIG. 13 includes FIG. 13A, which is a plan view of a portion of a bottom housing of a mobile device, and FIG. 13B, which is a top view of the portion of the bottom housing shown in FIG. 13A.
Figure 13A:
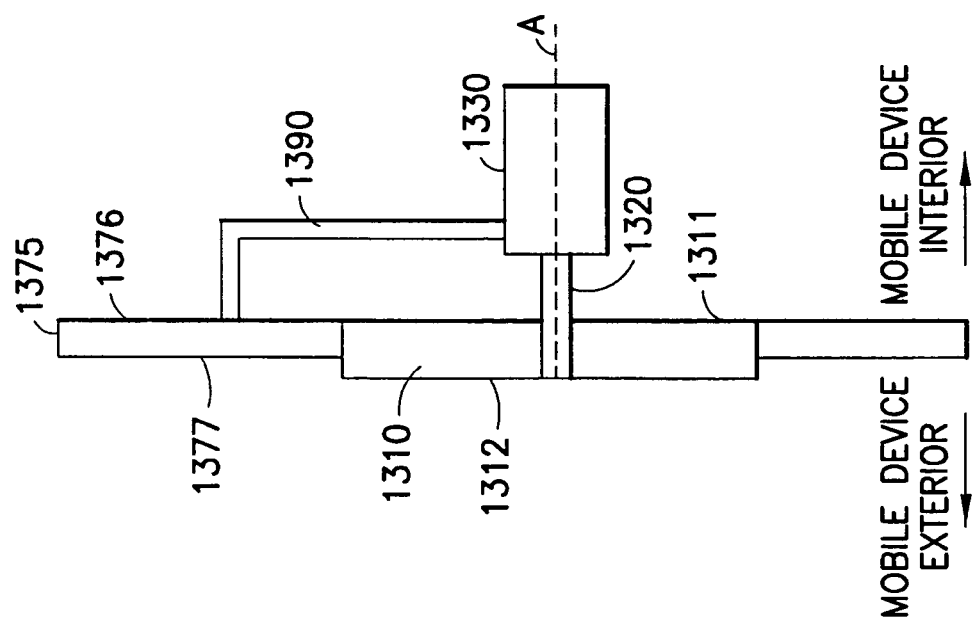

Referring now to FIG. 13, this figure includes FIG. 13A, which is a plan view of a portion of a bottom housing 1375 of a mobile device 10, and FIG. 13B, which is a top view of the portion of the bottom housing 1375 shown in FIG. 13A. In terms of this example, the bottom housing 1375 has a rotatable disc 1310 attached to a shaft 1320 of a motor 1330. The surface 1376 of the bottom housing 1375 and the surface 1311 of the rotatable disc 1310 face the interior of the mobile device 10, and the outer surface 1377 of the bottom housing 1375 and the outer surface 1312 of the rotatable disc 1310 face outside of the mobile device 10. The surface 1312 protrudes slightly from the surface 1377 in this example to provide contact between the surface 1312 and a surface (not shown) onto which the mobile device 10 would be placed. In this example, the motor 1330 is a variable speed DC motor and is controlled at a low rotational speed to rotate the mobile device 10 about an axis A. However, a fixed speed DC motor may also be used with appropriate gearing (not shown) to reduce rotational speed of the motor 1330. A support 1390 is used to couple the motor 1330 to the bottom housing 1375 and to route wires (not shown) to the motor 1330.

Figure 14A:
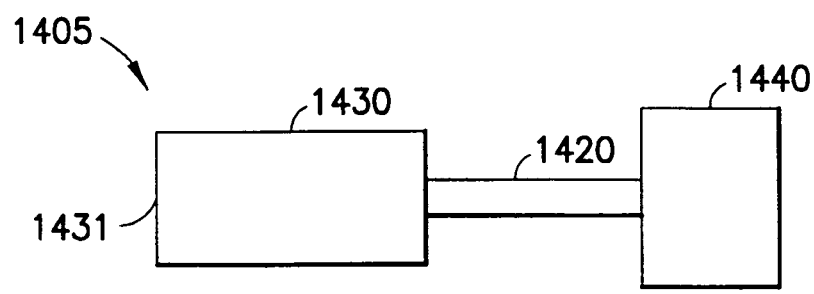
FIG. 14A, which is a plan view of a motor assembly configured to cause rotation of a mobile device.
Figure 14B:
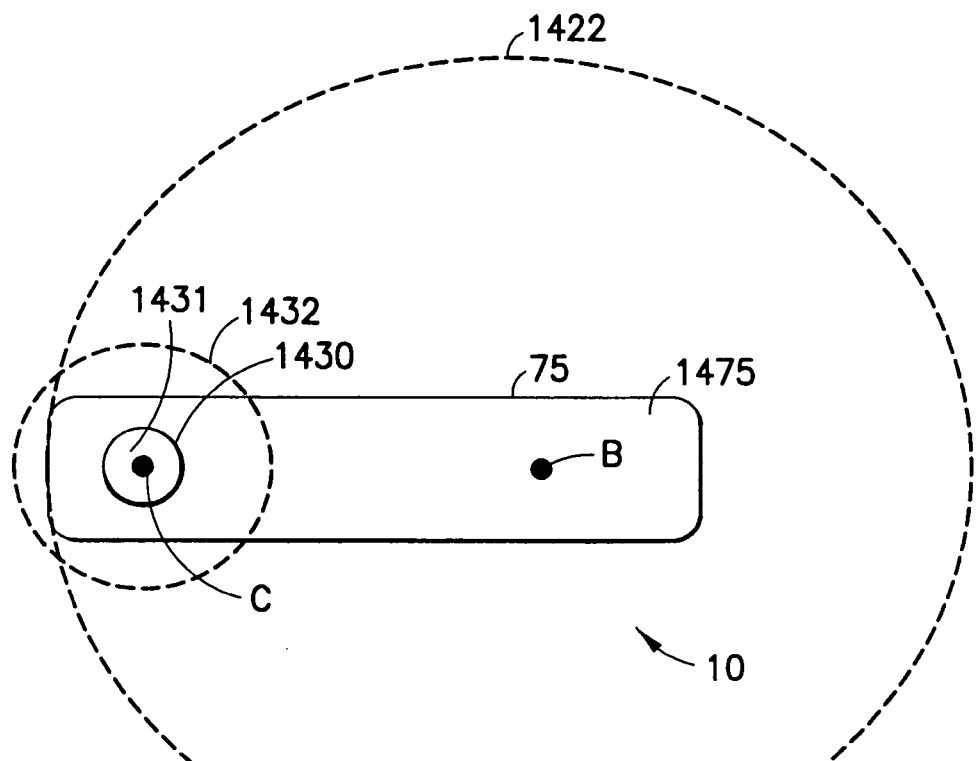
FIG. 14B, which a top view of a mobile device and the top view shows the rotation of the motor and of the entire mobile device.

Turning to FIG. 14, this figure includes FIGS. 14A through 14D. FIG. 14A is a plan view of a motor assembly 1405 configured to cause rotation of a mobile device 10, and FIG. 14B is a top view of a mobile device 10 and the top view shows the rotation 1432 of the motor 1430 and rotation 1422 of the entire mobile device 10. The motor assembly 1405 includes a motor 1430 having a shaft 1420 connected to or comprising a weight 1440. An end 1431 of the motor is shown and the motor 1430 is positioned in the mobile device 10 to rotate 1432 around axis C. The motor 1430 is mounted so that the axis of rotation C of the rotor shaft 1420 is substantially parallel to the axis of rotation B of the mobile device 10. The motor assembly 1405 comprises a standard DC motor 1430. The rotor shaft 1420 of the motor 1430 is shown loaded with a weight 1440 to give the arrangement 1405 a greater moment of inertia. The addition of a weight 1440 may not be necessary depending on, e.g., the mass and moment of inertia, of the entire mobile device 10. The rotation 1432 of the motor 1430 and its shaft 1420 (and weight 1440) causes rotation 1422 of the mobile device 10 about axis B.

Figure 14C:
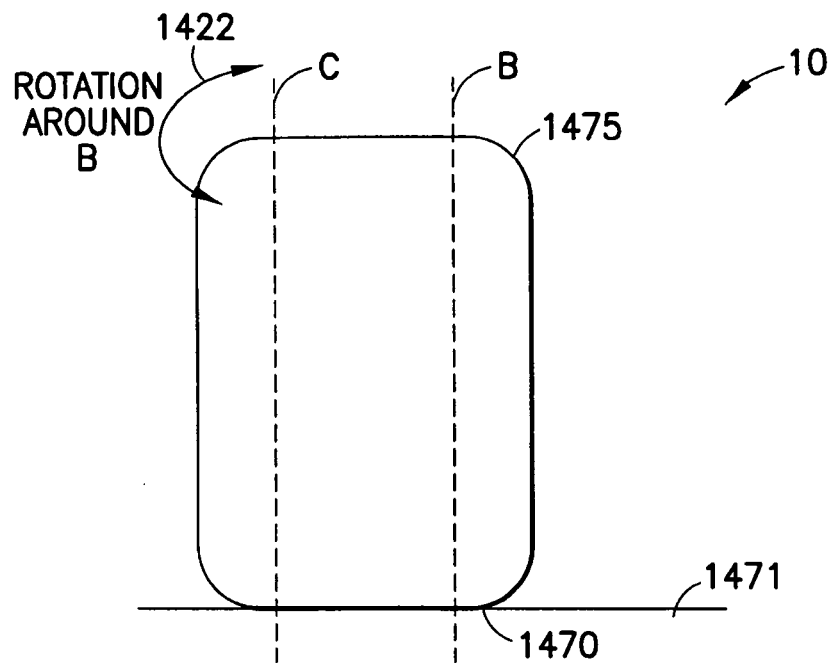
FIG. 14C, which is a front view of the mobile device 10.

FIG. 14C shows that the mobile device 10 will rotate around axis B in response to the motor 1430 being engaged (e.g., activated) when the mobile device 10 is placed so that a side surface 1470 of the mobile device 10 is in contact with a surface 1471 such as a desktop, tabletop, or other surface.

Figure 14D:
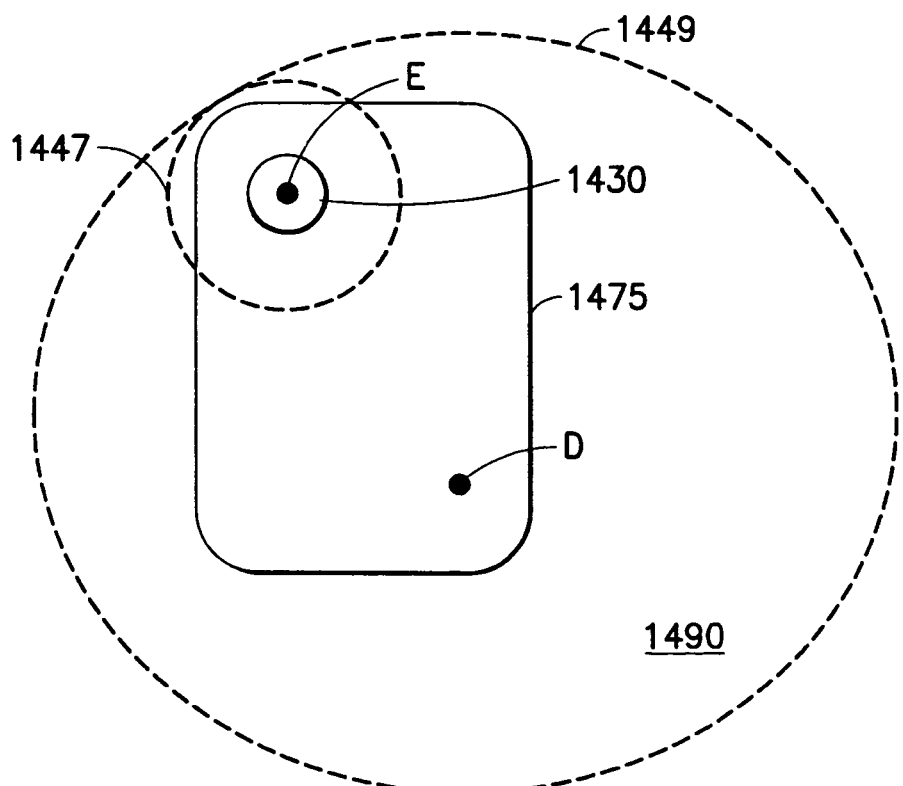
FIG. 14D, which is another front view of the mobile device 10.

FIG. 14D shows another front view of the mobile device 10. In this example, the motor 1430 (and shaft 1420 and weight 1440) is positioned in the housing 1475 so that the motor 1430 rotates 1447 about axis E and causes the mobile device 10 to rotate 1449 about axis D.

Without in any way limiting the scope, interpretation, or application of the claims appearing below, a technical effect of one or more of the example embodiments disclosed herein is to improve reception of radio frequencies. Another technical effect of one or more of the example embodiments disclosed herein is the ability for a device to direct itself to a direction having better RF reception relative to other directions.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer. Any of the flowcharts above may be methods or may be operations performed, e.g., by hardware.

It is also noted that any of the embodiments herein (including in the claims) may be implemented in an apparatus/device that includes means for performing certain functions. For example, a device could comprise at least one transducing means (e.g., one or more antennas 36) and receiving means (e.g., receivers 120, 130, 140) over which radio frequency reception occurs. The device could further include means for measuring performance of one or more radio frequency reception parameters for the radio frequency reception and means for causing movement of the device to improve the performance of the one or more radio frequency reception parameters. The device could include means for causing vibration of the mobile device, such as the vibration devices 150 and possibly the vibration circuitry 160 described above.

In other exemplary embodiments, a computer program comprises code for code for measuring, under control of at least one processor of a device, performance of at least one radio frequency reception parameter for radio frequency reception of the device, the device comprising at least one antenna over which the radio frequency reception occurs and the at least one processor, and code for causing movement of the device to improve the performance of the at least one radio frequency reception parameter, when the computer program is run on a processor.

Another exemplary embodiment includes the computer program according to the preceding paragraph, wherein the computer program is a computer program product comprising a computer-readable medium bearing computer program code embodied therein for use with a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. A method comprising:
measuring, under control of at least one processor of a mobile device, performance of at least one radio frequency reception parameter for radio frequency reception of the mobile device, the mobile device comprising at least one antenna over which the radio frequency reception occurs and the at least one processor; and
in response to the measured performance, causing automatic movement by the mobile device to change the positioning thereof to improve the performance of the at least one radio frequency reception parameter,
wherein causing automatic movement further comprises causing vibration of the mobile device to cause the mobile device to rotate to improve the performance of the at least one radio frequency reception parameter.

2. The method of claim 1, wherein causing vibration further comprises causing a vibration device to accelerate in a predetermined vibration mode, transitioning to a deceleration, and decelerating the vibration device, and repeating the acceleration, transitioning, and deceleration while rotation of the mobile device is desired.

3. The method of claim 2, wherein decelerating the vibration device comprises letting friction of at least the vibration device reduce vibration of the vibration device.

4. The method of claim 2, wherein decelerating the vibration device comprises reversing polarity of a voltage applied to the vibration device from a first polarity of the voltage applied to accelerate the vibration device to a second polarity of the voltage.

5. The method of claim 2, wherein:
the acceleration, transitioning, and deceleration cause the mobile device to rotate in a first direction;
the predetermined vibration mode is a first predetermined vibration mode; and
causing vibration further comprises causing the mobile device to move in a second direction opposite the first direction by causing the vibration device to accelerate in a second predetermined vibration mode opposite from the first predetermined vibration mode, transitioning to a deceleration, and decelerating the vibration device.

6. The method of claim 1, in response to a user selecting a channel over which the radio frequency reception is to occur:
measuring further comprises measuring, while vibration is occurring, a number of values for the performance of the at least one radio frequency reception parameter for the channel; and
causing vibration further comprises causing vibration to rotate the mobile device to a location determined to meet at least one predetermined threshold criterion as measured by at least one corresponding value for the at least one radio frequency reception parameter.

7. The method of claim 1, wherein causing movement further comprises causing rotation of a motor coupled to a housing of the mobile device to cause the mobile device to rotate.

8. The method of claim 1, wherein:
measuring further comprises measuring, while movement is occurring, a number of values for the performance of the at least one radio frequency reception parameter; and
causing movement further comprises using the values to determine movement of the mobile device that improves the performance.

9. The method of claim 1, wherein the at least one radio frequency reception parameter comprises at least one of a radio frequency receive signal strength indicator (RSSI) value, a signal to noise ratio (SNR) value, or a number of channels found during a frequency band scan.

10. A mobile device comprising:
at least one antenna and a receiver over which radio frequency reception occurs;
at least one processor; and
at least one memory including computer program code, the at least one memory and the computer program code configured to, with the at least one processor, cause the mobile device to perform at least the following:
measuring, under control of the at least one processor, performance of at least one radio frequency reception parameter for the radio frequency reception; and
in response to the measured performance, causing automatic movement by the mobile device to change the positioning thereof to improve the performance of the at least one radio frequency reception parameter,
wherein causing automatic movement further comprises causing vibration of the mobile device to cause the mobile device to rotate to improve the performance of the at least one radio frequency reception parameter.

11. The mobile device of claim 10, wherein the mobile device further comprises a vibration device configured to vibrate the mobile device, and wherein causing movement further comprises causing vibration of the vibration device to cause the mobile device to rotate to improve the performance of the at least one radio frequency reception parameter.

12. The mobile device of claim 10, further comprising a housing and a motor coupled to the housing, wherein causing movement further comprises causing rotation of the motor coupled to cause the mobile device to rotate.

13. The mobile device of claim 10, wherein:
measuring further comprises measuring, while movement is occurring, a number of values for the performance of the at least one radio frequency reception parameter of the receiver; and
causing movement further comprises using the values to determine movement of the mobile device that improves the performance.

14. The mobile device of claim 10, wherein the at least one radio frequency reception parameter comprises at least one of a radio frequency receive signal strength indicator (RSSI) value, a signal to noise ratio (SNR) value, or a number of channels found during a frequency band scan.

15. A computer program product comprising a computer-readable memory medium bearing computer program code embodied therein for use with a computer, the computer program code comprising:
code for measuring, under control of at least one processor of a mobile device, performance of at least one radio frequency reception parameter for radio frequency reception of the mobile device, the mobile device comprising at least one antenna over which the radio frequency reception occurs and the at least one processor; and
code for causing automatic movement by the mobile device to change the positioning thereof to improve the performance of the at least one radio frequency reception parameter in response to the measured performance,
wherein causing automatic movement further comprises causing vibration of the mobile device to cause the mobile device to rotate to improve the performance of the at least one radio frequency reception parameter.

* * * * *